(12) United States Patent
Dif et al.

(10) Patent No.: US 6,528,183 B2
(45) Date of Patent: Mar. 4, 2003

(54) CLAD ALUMINUM ALLOY SHEET FOR AIRCRAFT STRUCTURAL PARTS

(75) Inventors: Ronan Dif, Saint-Etienne de Saint-Geoirs (FR); Bernard Bes, Seyssins (FR); Philippe Lassince, Issoire (FR); Herve Ribes, Issoire (FR)

(73) Assignee: Pechiney Rhenalu, Paris (FR)

( * ) Notice: Subject to any disclaimer, the term of this patent is extended or adjusted under 35 U.S.C. 154(b) by 0 days.

(21) Appl. No.: 09/898,491

(22) Filed: Jul. 5, 2001

(65) Prior Publication Data

US 2002/0031682 A1 Mar. 14, 2002

(30) Foreign Application Priority Data

Jul. 5, 2000 (FR) .............................. 00 08738

(51) Int. Cl.⁷ .............................. B32B 15/20; C22F 1/04
(52) U.S. Cl. .................. 428/654; 148/525; 148/535; 148/552; 148/691; 148/692; 148/693; 148/694; 148/700; 148/701; 228/112.1; 428/925; 428/933; 428/934
(58) Field of Search .................. 428/654, 925, 428/933, 934; 148/525, 535, 552, 691, 692, 693, 694, 700, 701; 228/112.1

(56) References Cited

U.S. PATENT DOCUMENTS

| 4,589,932 A | 5/1986 | Park ........................ 148/693 |
| 5,213,639 A | 5/1993 | Colvin et al. .............. 148/693 |
| 5,858,134 A | 1/1999 | Bechet et al. .............. 148/700 |
| 5,906,689 A | 5/1999 | Sircar ...................... 148/439 |

FOREIGN PATENT DOCUMENTS

| GB | 1004868 | 9/1965 |
| GB | 2321869 | 8/1998 |
| JP | 4-263033 | 9/1992 |
| WO | 98/28130 | 7/1998 |

*Primary Examiner*—Robert R. Koehler
(74) *Attorney, Agent, or Firm*—Dennison, Schultz & Dougherty

(57) ABSTRACT

Clad sheet made up of a core sheet and a cladding layer on one or two core sheet surfaces. The core sheet is formed of an alloy having the composition (% by weight) Si: 0.7–1.3, Mg: 0.6–1.2, Cu: 0.5–1.1, Mn: 0.15–1.0, Zn<0.5, Fe<0.5, Zr<0.2, Cr<0.25, other elements <0.05 each and <0.15 total, the remainder aluminum. The cladding is formed of an AlZn alloy having a thickness of between 1 and 15% of the clad sheet thickness, having the composition (% by weight) Zn: 0.25–0.7, Fe<0.40, Si<0.40, Cu, Mn, Mg, V or Ti <0.10, other elements <0.05 each and 0.15 total.

33 Claims, 1 Drawing Sheet

□ 6056 T4
◇ 6056 T4
■ 6056 T6
◆ 6056 T6
∗ 2024 T3
× 2024 T3

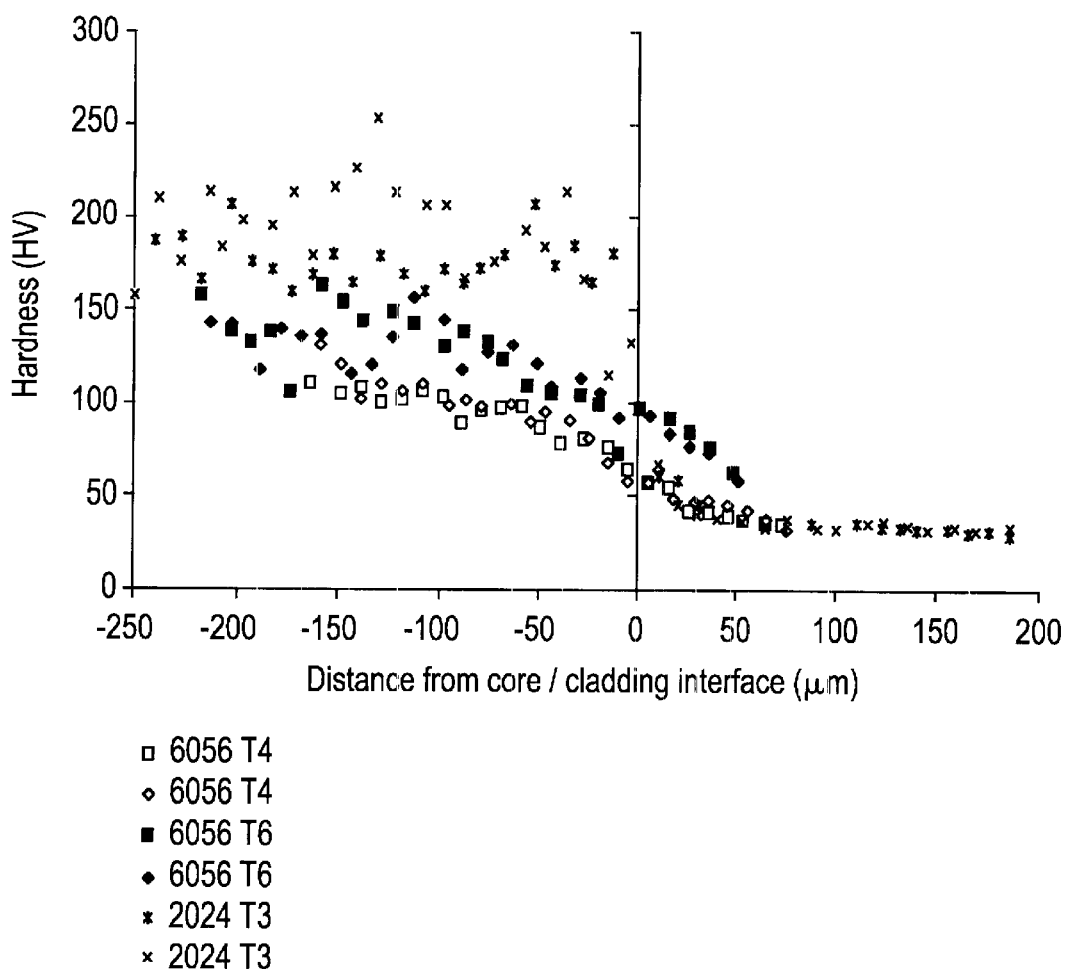

CLAD ALUMINUM ALLOY SHEET FOR AIRCRAFT STRUCTURAL PARTS

BACKGROUND OF THE INVENTION

1. Field of the Invention

The invention concerns aluminum sheet alloys of the 6000 series according to the nomenclature of The Aluminum Association, that are clad with another aluminum alloy and intended for the manufacture of aircraft structural parts, especially airplane fuselage panelling.

2. Description of Related Art

The fuselages of civil aircraft are for the most part made from 2024 alloy sheet, clad on either surface with a low composition aluminum alloy, an 1050 or 1070 alloy for example. The thickness of the cladding on each surface may, according. to the thickness of the core sheet, typically represent between 1% and 15% of the total thickness.

The purpose of the cladding alloy is firstly to provide sufficient corrosion resistance. Slightly generalized or pitting corrosion is tolerable but it must not be penetrating so as not to attack the core alloy. This evaluation must be made on the clad sheet in the temper of use, that is to say typically after solution heat treatment, quenching and optionally artificial ageing, since diffusion phenomena between core and cladding at the time of solution heat treatment may deteriorate the corrosion resistance of the cladding.

The cladding must also be able to act as a cathodic protection vis-a-vis the core, that is to say a sufficient difference in electrochemical potential must exist between cladding and core. This protective effect comes into play in particular should a scratch reach the core. The cladding may have other functions such as physical protection of the alloy against scratches and impacts, the providing of a layer that is easy to polish, for airlines desiring a metal rather than a painted appearance, or improved ability to undergo surface treatment, chemical polishing in particular, and the various pre-treatments that are required for the application of polymer coatings.

For several years, in lieu and stead of the 2024 or related alloys, AlMgSi alloys of the 6000 series have been proposed for fuselage panels. These alloys, which are also heat treatable, offer good mechanical characteristics in the heat treated state, a high elastic modulus and lower density than the 2024. In general, they have better corrosion resistance than the 2024 alloy. The alloys in the 6000 series are readily weldable making it possible to reduce the number of riveted assemblies which are a source of corrosion. Some of these alloys may be used in unclad form, in particular in metallurgic tempers that have been specially desensitized to intergranular corrosion. Such heat treatment process is described in patent EP 0787217, on behalf of the applicant, which concerns a special ageing treatment for 6056-type alloys, such as to desensitize the alloy to intergranular corrosion and allow its use for aircraft fuselages. Nevertheless, even in this temper, the 6056 alloy may show certain sensitivity to pitting corrosion. Preference may therefore be given to clad sheet.

U.S. Pat. No. 4,589,932 (Alcoa) describes the use for airplane structural parts of an alloy later registered under designation 6013, having the composition (% by weight): Si: 0.4–1.2, Mg: 0.5–1.3, Cu: 0.6–1.1, Mn: 0.1–1, Fe<0.6.

Patent EP 0173632, filed on behalf of the applicant, describes an alloy later registered under designation 6056, having the composition (% by weight): Si: 0.9–1.2, Mg: 0.7–1.1, Cu: 0.3–1.1, Mn: 0.25–0.75, Zn: 0.1–0.7, Zr: 0.07–0.2, Fe<0.3.

Patent FR 2704557, also filed on behalf of the applicant, concerns clad sheet for fuselages comprising a core in alloy 2000 or alloy 6000 containing copper, and cladding whose difference in potential relative to the core is between 90 and 130 mV. The cladding alloy is preferably a 6000 alloy having the composition (% by weight): Si: 0.15–0.6, Mg: 0.3–0.8, Cu<0.1 Mn<0.4, Fe<0.4.

The manual <<Aluminum—Properties and Physical Metallurgy>> published by the American Society for Metals under the direction of J. E. Hatch (1984), pp. 301, 372 and 373, gives as clad products (<<Alclad>>) products which for cladding use alloys of the 1000 type or the 7072 alloy (AlZn alloy containing approximately 1% Zn) for cores in 2000 alloys; the 7072 alloy is also used for cores in alloys 3003, 3004, 6061, 7075 and 7178. According to standard ASTM B209, cladding alloys may also include alloys in the 6000 series (2014 clad with 6003) and other alloys of 7000 type (such as 7008 and 7011).

As a general rule, the above-mentioned manual by Hatch recommends a difference in potential between the cladding and the core of at least 100 mV. Products do exist however which have a lower potential than 100 mV, such as Alclad 2014 (2014 T8 clad with 6003)and 2014 T8 clad with 1050. Moreover, experience of persons skilled in the art shows that it is preferable to limit the difference in potential to a value of approximately 130 mV to 150 mV, in order to avoid too high corrosion risks when assembling the two layers of metal. It is therefore considered that a difference in potential of between approximately 60 mV and 130 mV provides the clad product with sufficient cathodic protection.

SUMMARY OF THE INVENTION

The purpose of the present invention is to provide sheet alloy for fuselages in an alloy of the 6000 series, with which it is possible to attain properties of use that are comparable with those of the 2024 alloy, whose cladding ensures sufficient corrosion resistance in the heat treated state and sufficient cathodic protection, which does not however go as far as causing fast disappearance of the cladding layer, which would be contrary to the desired protection. It is also desirable that the cladding alloy should be chosen such that its application to the core alloy by co-rolling can be achieved without too much difficulty, that it does not contain elements that hinder the recycling of production scrap and that it has acceptable mechanical resistance so as not to deteriorate the mechanical resistance of the clad sheet.

A further purpose of the present invention is to put forward a process for manufacturing an aircraft structural part incorporating said clad sheet with which it is possible to draw maximum benefit from the metallurgical characteristics of this clad sheet.

DETAILED DESCRIPTION OF THE INVENTION

The subject of the invention is sheet clad on one or two surfaces, made up of a core sheet in an alloy having the composition (% by weight): Si: 0.7–1.3, Mg: 0.6–1.2 (preferably 0.7–1.1), Cu: 0.5–1.1, Mn: 0.15–1.0 (preferably 0.3–0.7), Zn<0.5, Fe<0.5 (preferably <0.3), Zr<0.2, Cr<0.25, other elements <0.05 each and <0.15 total, the remainder aluminum, and of cladding in an aluminum alloy on at least one surface of the sheet, having a thickness per surface of between 1 and 15% (and preferably 1.5 to 12%) of the total thickness, this cladding alloy being an alloy of AlZn type containing (% by weight) from 0.25 to 0.7% (and preferably from 0.3 to 0.6%) of zinc, less than 0.40% iron, less than 0.40% (and preferably less than 0.25%) silicon, less than 0.10% of each of the elements copper, manganese, magnesium, titanium or vanadium, and less than 0.05% each and 0.15% total for the other elements, the remainder aluminum.

A further subject of the invention is an aircraft structural part, such as a fuselage coating panel, comprising sheet clad on one or both surfaces made up of a core sheet and cladding, the core sheet and the cladding having the above-mentioned compositions.

A further subject of the invention is a manufacturing process to produce an aircraft structural part comprising:
a) the manufacture by hot rolling of clad sheet, made up of a core sheet in an alloy having the composition (% by weight): Si: 0.7–1.3, Mg: 0.6–1.2 (preferably 0.7–1.1) Cu: 0.5–1.1, Mn: 0.15–1.0 (preferably 0.3–0.7) Zn<0.5 Fe<0.5 (and preferably <0.3) Zr<0.2 Cr<0.25 other elements <0.05 each and <0.15 total, the remainder aluminum, and of cladding in aluminum alloy on at least one surface, having a thickness per surface of between 1 and 15% (and preferably 1.5 to 12%) of the total thickness, this cladding consisting on at least one surface of an AlZn alloy containing (% by weight) from 0.25 to 0.7% (and preferably 0.3 to 0.6,%) zinc, less than 0.40% iron, less than 0.40% (preferably less than 0.25%) silicon, less than 0.10% of each of the elements copper, manganese, magnesium, titanium or vanadium, other elements <0.05% each and <0.15% total, the remainder aluminum, the other surface possibly being clad with a second alloy, in particular an alloy of 4000 type;
b) optionally one or more cold rolling passes;
c) solution heat treatment followed by quenching;
d) optionally one or more finishing operations such as crease recovery, roller levelling or controlled stretching;
e) optional sheet forming;
f) assembly of the structural part by riveting several sheets, and welding or riveting on stiffeners or frames.
g) optional artificial ageing of the structural part.

BRIEF DESCRIPTION OF THE DRAWING

The sole drawing FIGURE is a graph of hardness vs. distance from the core/cladding interface for the clad sheets of Example 4.

DESCRIPTION OF THE PREFERRED EMBODIMENTS

All the chemical compositions are expressed in % by weight, unless otherwise indicated, and the rounding rules of European standard EN 573-3 are applied. The metallurgical tempers are those defined by European standard EN 515.

The alloy sheets of 6000 type are arousing increasing interest for aircraft construction. More precisely, the composition area of:

Si: 0.7–1.3, Mg: 0.6–1.2, Cu: 0.5–1.1, Mn: 0.15–1.0, Zn<0.5, Fe<0.5, Zr<0.2, Cr<0.25, other elements <0.05 each and <0.15 total, the remainder aluminum, which in particular encompasses alloy 6056, can be used to produce sheet material which offers particularly advantageous properties.

For the reasons set forth above, this sheet material must be clad, the thickness of the cladding being between 1and 15% of the total thickness of the sheet. The inventors have found that none of the cladding alloys described in the literature gives satisfaction for this application. According to the invention, this cladding alloy is an alloy of AlZn type containing from 0.25 to 0.7% Zn, up to 0.40% iron, up to 0.40% silicon, and up to 0.10% of each of the elements copper, manganese, magnesium, titanium or vanadium, the other elements each being <0.05% and <0.15% total, the remainder being aluminum.

In one preferred embodiment of the invention, the core is made up of an alloy sheet having the composition (% by weight): Si: 0.7–1.3, Mg: 0.7–1.1, Cu: 0.5–1.1, Mn: 0.3–0.7, Zn<0.5, Fe<0.3, Zr<0.2, Cr<0.25, other elements <0.05 each and <0.15 total, the remainder being aluminum, and of cladding in an aluminum alloy on at least one surface of the sheet, having a thickness per surface of between 1.5 to 12% of the total thickness, this cladding alloy being an alloy of AlZn type containing from 0.3 to 0.6% Zn, up to 0.40% iron, up to 0.25% silicon, other elements <0.05% each and <0.15% overall. It is advantageous that the grain size at mid-thickness within the core should be less than 250 μm and preferably less than 180 μm. The total thickness of the sheet advantageously lies between 1 mm and 10 mm. In order to obtain core sheet with high mechanical strength, it is advantageous to select a chemical composition for the core alloy such that the sum (Si+Mg+3 Cu) is greater than 3.50 (wherein the individual concentrations are expressed in % by weight).

This clad sheet, after solution heat treatment, quenching and artificial ageing, shows a difference in electrochemical potential between the core and the cladding alloy in this final state of between 50 mV and 110 mV, and further preferably of between 60 mV and 100 mV.

According to the invention, the sheet in 6000 type alloy may be clad on one or two surfaces with a cladding sheet in an alloy of AlZn type. If the sheet in 6000 alloy is only clad on one surface with the cladding sheet in AlZn type alloy, the other surface may either remain uncoated or be clad with a sheet in a second cladding alloy, in particular an alloy of 4000 type, and more especially a 4043, 4045 or 4047 alloy. This second cladding sheet in 4000 alloy in this case performs a different function to that of the said cladding sheet in AlZn alloy: having a melting point that is significantly lower than that of the core sheet, it facilitates welding of the sheet. The thickness of this second cladding is advantageously between 1.5% and 12% of the total thickness of the clad sheet.

The clad sheets of the invention may undergo advantageously one or more finishing operations such as crease recovery, roller levelling or controlled stretching.

The clad sheets of the invention may be used to manufacture aircraft structural parts. One advantageous manufacturing process for this structural part comprises the following steps:
a) manufacture by hot rolling of a clad sheet, made up of a core sheet in an alloy having the composition (% by weight):
Si: 0.7–1.3, Mg: 0.6–1.2 (preferably 0.7–1.1) Cu: 0.5–1.1, Mn: 0.15–1.0 (preferably 0.3–0.7) Zn<0.5, Fe<0.3, Zr<0.2, Cr<0.25, other elements <0.05 each and <0.15 overall, the remainder aluminum,
and of cladding in aluminum alloy on at least one surface, having a thickness per surface of between 1 and 15% (and preferably from 1.5 to 12%) of the total thickness, said cladding consisting of an AlZn alloy containing (% by weight) from 0.25 to 0.7% zinc, up to 0.40% iron, up to 0.40% silicon, up to 0.10% of each of the elements copper, manganese, magnesium, titanium or vanadium, other elements <0.05% each and <0.15% overall, the remainder aluminum, the other surface possibly being clad in a different cladding alloy, in particular an alloy of the 4000 series;
b) optionally one or more cold rolling passes, making it possible to achieve smaller thicknesses;
c) solution heat treatment followed by quenching;
d) optionally one or more finishing operations such as crease recovery, roller levelling or controlled stretching;
e) optional sheet forming;
f) assembly of the structural part in particular by rivetting several sheets, and welding or rivetting on stiffeners;
g) possible artificial ageing of the structural part so formed.

Before applying the cladding, the rolling ingot forming the core material may be homogenised, preferably in two temperature steps, the first step being conducted at between 530 et 550° C., for a period of between 1 and 8 h, and the second step at between 555 and 575° C., for a period of between 18 and 36 h.

Forming of the sheet may advantageously be made by drawing-forming, pressing, fluoturning or bending, these techniques being known to persons skilled in the art. For the assembly of the structural part, all known rivetting and welding techniques adapted for aluminum alloys are suitable. The sheets may be fixed to stiffeners or frames by rivetting or welding. If welding is chosen, the inventors have found that it is preferable to use low heat welding techniques which ensure that the heat affected zone is as small as possible. In this respect, laser and friction welding give particularly satisfactory results. The use of a cladding alloy in the 4000 series, and particularly of a 4043, 4045 or 4047 alloy on the other surface of the sheet facilitates welding operations, avoiding for example the use of a filler alloy.

The sheet of the invention, before or after forming, may advantageously be subjected to artificial ageing to impart improved static mechanical properties. One particularly appropriate treatment may be conducted at a temperature of between 170° C. and 200° C. for a period ranging from 1 h to 10 h. This artificial ageing may also be conducted in advantageous manner on an assembled structural part. In some cases, a treatment of T78 type such as described in patent EP 0787217, intended to desensitise the alloy against intergranular corrosion, may be advantageous.

A structural part according to the invention, formed of sheet and stiffeners or frames, these stiffeners or frames being preferably made of extruded profiles, may be used in particular for airplane fuselage construction.

The inventors found that the clad sheet of the invention has particularly favourable static mechanical properties. With known clad products, the cladding sheet has low tensile and yield strengths compared with the core material. Clad sheet therefore has reduced static mechanical properties compared with unclad sheet (also called "bare" sheet) of the same total thickness, same alloy and same metallurgical temper. For the clad sheet of the invention, this reduction in mechanical properties is very small and favours its industrial application to aircraft structural parts, the tensile strength and yield strength of sheet material being characteristics that are directly taken into account for the calculation of structural dimensioning.

The AlZn alloy cladding of the invention does not raise any particular problems during subsequent surface treatment operations, in particular for mechanical or chemical polishing, or treatments intended to improve the adhesion of polymer coatings.

EXAMPLE 1

Unclad sheet in 6056 alloy was produced by casting a rolling ingot in aluminum alloy containing (% by weight) 0.91% Si, 0.76% Mg, 0.64% Cu, 0.59% Mn, 0.13% Fe and 0.17% Zn, scalping, reheating to 530° C., hot rolling in a reversing mill followed by a tandem mill, to a thickness of 4 mm, coiling and cutting the strip into sheets. The sheet was solution heat treated for 40 minutes at 550° C. and then quenched. Some of the sheets were subjected to T6 artificial ageing (4 h at 190° C.). The static mechanical properties obtained are given in Table 1:

TABLE 1

|  | Direction TL | | | Direction L | | |
| --- | --- | --- | --- | --- | --- | --- |
|  | $R_{p0.2}$ [MPa] | $R_m$ [MPa] | A [%] | $R_{p0.2}$ [MPa] | $R_m$ [MPa] | A [%] |
| T4 temper | 218 | 308 | 20 | — | — | — |
| T6 temper | 349 | 379 | 11 | 355 | 366 | 13.5 |

The crack propagation rate da/dN was measured using standard ASTM E647 for R=0.1 on a CCT-type test piece of width W=400 mm with an initial crack length $2a_o$=4 mm, at a frequency f=3 Hz.

The results are grouped together in Table 2:

TABLE 2

| ΔK [MPa√m] | 10 | 20 | 30 | 40 | 50 |
| --- | --- | --- | --- | --- | --- |
| da/dN (direction T–L) [mm/cycle] | $1.7 \times 10^{-4}$ | $1.2 \times 10^{-3}$ | $5 \times 10^{-3}$ | $1.4 \times 10^{-2}$ | — |
| da/dN (direction L–T) [mm/cycle] | $8 \times 10^{-5}$ | $8 \times 10^{-4}$ | $2,5 \times 10^{-3}$ | $5 \times 10^{-3}$ | — |

Plane stress fracture toughness was measured using standard ASTM E561 on a CCT-type test piece of width W=760 mm and initial crack length $2a_o$=253 mm. The test gave the curve R of the material, indicating the fracture resistance $K_R$ relative to crack extension Δa. The results are grouped together in Table 3.

TABLE 3

| Δa [mm] | 10 | 20 | 30 | 40 | 50 |
| --- | --- | --- | --- | --- | --- |
| $K_R$ (direction T–L) [MPa√m] | 89 | 109 | 122 | 133 | 142 |
| $K_R$ (direction L–T) [MPa√m] | 101 | 129 | 149 | 166 | 180 |

Using this curve, it is then possible, following the procedure set forth by L. Schwarmann in Aluminum, 1991, vol. 67, n. 5, p. 479, to calculate the apparent fracture toughness $K_{C0}$ and the effective fracture toughness $K_C$ corresponding to the rupture of a virtual CCT-type test piece width W=400 mm and initial crack length $2a_o$=133 mm. It is found that:

in T-L direction:

$K_{C0}$=93.2 MPa√m, $K_C$=126.1 MPa√m in L-T direction:

$K_{C0}$=114.1 MPa√m, $K_C$=165 MPa√m

EXAMPLE 2

A sheet in 6056 alloy clad on both surfaces was manufactured by casting a rolling ingot in aluminum alloy containing (% by weight) 0.85% Si, 0.71% Mg, 0.67% Cu, 0.59% Mn, 0.12% Fe and 0.15% Zn, scalping, positioning on both surfaces of this scalped ingot of coating sheets containing 0.11% Si, 100 μg/g Mg, 28 μg/g Cu, 145 μg/g Mn, 0.22% Fe and 0.50% Zn. After reheating to 530° C., this plate was hot rolled in a reversing mill then in a tandem mill to a thickness of 4.5 mm. After coiling, the strip was cut into sheets. The sheets were solution heat treated for 40 minutes at 550° C. and then quenched. Some of the sheets were subjected to T6 artificial ageing(4 h at 190° C.). The thickness of the cladding was 110 μm on each surface. Grain size in direction L within the core at mid-thickness was in the order of 335 μm to 375 μm.

The static mechanical properties obtained are given in Table 4:

TABLE 4

| | Direction TL | | | Direction L | | |
|---|---|---|---|---|---|---|
| | $R_{p0.2}$ [MPa] | $R_m$ [MPa] | A [%] | $R_{p0.2}$ [MPa] | $R_m$ [MPa] | A [%] |
| T4 temper | 176 | 308 | 21.4 | — | — | — |
| T6 temper | 346 | 384 | 10.6 | 353 | 370 | 12.5 |

The crack propagation rate da/dN was measured as in Example 1. The results are grouped together in Table 5 (two measurements):

TABLE 5

| $\Delta K$ [MPa√m] | 10 | 20 | 30 | 40 | 50 |
|---|---|---|---|---|---|
| Da/dn (direction T–L) [mm/cycle] | 1.4 & 1.6 × $10^{-4}$ | 1.0 & 1.3 × $10^{-3}$ | 3.2 & 3.8 × $10^{-3}$ | 1.5 & 1.2 × $10^{-2}$ | 4 & 2.7 × $10^{-2}$ |
| da/dn (direction L–T) [mm/cycle] | 1.2 & 1.1 × $10^{-4}$ | 8.8 & 9.4 × $10^{-4}$ | 2.8 & 3.0 × $10^{-3}$ | 7 & 8 × $10^{-3}$ | 1.6 & 2.0 × $10^{-2}$ |

Plane stress fracture toughness was measured as in Example 1. The results are grouped together in Table 6.

TABLE 6

| $\Delta a$ [mm] | 10 | 20 | 30 | 40 | 50 |
|---|---|---|---|---|---|
| $K_R$ (direction T–L) [MPa√m] | 80 | 101 | 115 | 125 | 133 |
| $K_R$ (direction L–T) [MPa√m] | 102 | 127 | 145 | 160 | 173 |

On the basis of the same calculation as in Example 1, the apparent and effective fracture toughness values are:
in direction T-L:

$K_{C0}$=87.6 MPa√m, $K_C$=118.9 MPa√m in direction L-T:

$K_{C0}$=111.3 MPa√m, $K_C$=157.1 MPa√m

Comparison of these values with those typically obtained for clad 2024-T351 alloy sheet, such as that described in patent application FR 99-04685, table 7, example 3u:
in direction T-L:

$K_{C0}$: approx. 78 MPa√m, $K_C$: approx. 122 MPa√m in direction L-T:

$K_{C0}$: approx. 93 MPa√m, $K_C$: approx. 140 MPa√m emphasizes the good suitability of the sheet of the invention for the manufacture of aircraft fuselage parts.

The corrosion potential of the sheet of the invention was determined both in the cladding and in the core according to standard ASTM G69 relative to a saturated calomel electrode. The results are grouped together in Table 7. They relate to three short spaced points of measurement in the same sample.

TABLE 7

| | Eo in mV/SCE | | | |
|---|---|---|---|---|
| Cladding | −834 | −838 | −836 | ΔE = 90 to 100 mV |
| Core (surface) | −740 | −738 | −738 | |
| Core (center) | −745 | −748 | −747 | |

EXAMPLE 3

6056 alloy sheet, clad on both surfaces, was manufactured as in Example 2. The chemical composition of the core was the following (% by weight): 1.01% Si, 0.71% Mg, 0.67% Cu, 0.55% Mn, 0.14% Fe and 0.15% Zn. Unlike Example 2, homogenisation (4 hours at 540° C. and 24 h at 565° C.) was conducted before applying the cladding. The cladding was the same as in Example 2, and was of the same thickness. Grain size in direction L within the core at mid-thickness was 145 μm. On this account, this clad sheet, after chemical polishing, showed less surface roughness than the sheet in Example 2. The static mechanical properties in T4 and T6 temper are given in Table 8:

TABLE 8

| | $R_{0.2}$ (MPa) | $R_m$ (MPa) | A (%) | $R_{0.2}$ (MP) | $R_m$ (MP) | A (%) |
|---|---|---|---|---|---|---|
| Direction | TL | TL | TL | L | L | L |
| T4 | 170 | 299 | 27.0 | | | |
| T6 | 346 | 380 | 11.3 | 359 | 376 | 12.0 |

The crack propagation rate da/dN was measured as in Example 1. The results are grouped together in Table 9:

TABLE 9

| $\Delta K$ [MPa√m] | 10 | 20 | 30 | 40 | 50 |
|---|---|---|---|---|---|
| da/dn (direction T–L) [mm/cycle] | 1.8 × $10^{-4}$ | 1.3 × $10^{-3}$ | 4.1 × $10^{-3}$ | 1.3 × $10^{-2}$ | 2.8 × $10^{-2}$ |
| da/dn (direction L–T) [mm/cycle] | 1.4 × $10^{-4}$ | 1.0 × $10^{-3}$ | 2.9 × $10^{-3}$ | 9.6 × $10^{-3}$ | 2.3 × $10^{-2}$ |

Plane stress fracture toughness was measured as in Example 1. The results are grouped together in Table 10:

TABLE 10

| $\Delta a$ [mm] | 10 | 20 | 30 | 40 | 50 |
|---|---|---|---|---|---|
| $K_R$ (direction T–L) [MPa√m] | 90 | 109 | 121 | 130 | 137 |
| $K_R$ (direction L–T) [MPa√m] | 93 | 118 | 136 | 150 | 164 |

On the basis of the same calculation as in Example 1, the apparent and effective fracture toughness values are found to be:

in direction T-L:

$K_{C0}$=104.6 MPa√m, $K_C$=151.7 MPa√m in direction L-T:

$K_{C0}$=91.8 MPa√m, $K_C$=119.7 MPa√m

EXAMPLE 4

Polished cross sections of clad sheet were prepared: 12024 clad with 1050, T3 temper
 (a) clad 6056 according to Example 2, T4 temper
 (b) clad 6056 according to Example 2, T6 temper Vickers microhardness was measured in the cladding and in the core on a polished section, in direction TC-TL, using a LECO-400-G2 microhardness meter with a load of 5 g, an application time of 10 s and rate of.application of 60 μm/s. For each sample two curves.were recorded representing Vickers microhardness in relation to the distance from the interface between core and cladding. These curves are shown in the single FIGURE.

It is found with clad 2024 that there is a very sudden drop in hardness when passing from the core to the cladding. The 6056 sheet clad with AlZn according to example 2, in T4 temper, shows a less sudden transition at the interface. This would seem to indicate the existence of atom diffusion from the core towards the cladding.

While, in the T4 temper, the hardness of the AlZn cladding on 6056 is of the same order of magnitude as that of 1050 on 2024, it is found on the other hand that there is distinct hardening of the AlZn cladding on 6056 in the T6 temper. Moreover, observation under scanning electronic microscopy shows precipitation hardening of the same type as in the core.

Under optimal conditions of use (that is to say T6 for a core in 6056 and T3 or T4 for a core in 2024), the hardness of the cladding is greater for the product of the invention (6056 clad with AlZn) than for the standard product of the prior art (2024 clad with 1050). This improved hardness leads to improved physical protection of the core and a lesser reduction in tensile strength $R_{p0.2}$. This last aspect is also directly demonstrated by comparison of the $R_{p0.2}$ values of Examples 1 (prior art: 6056 T6 non-clad) and 2 (6056 clad with AlZn according to the invention): in direction L a $R_{p0.2}$ value of 355 MPa is found for the unclad sheet, and a value of 353 MPa for the clad sheet: this reduction in the order of 1% is insignificant. On the other hand, for the reference product of the prior art, 2024 T351 clad with 1050, a reduction of 5 to 10% is frequently observed; this is shown for example in the article by R. J. H. Wanhill et al. <<Modern Aluminum Sheet Alloys for Aerospace Applications>>, published in the Proceedings of the <<3$^{rd}$ International Conference on Aluminum Alloys—Their Physical and Mechanical Properties>>, (ICAA 3) Atlanta, 1992, pp. 357–362.

EXAMPLE 5

On an experimental hot rolling mill, test pieces of a total thickness of 2 mm were prepared, clad on one surface, the cladding thickness being 100 μm. These test pieces were heat treated to T6 temper, this treatment comprising solution heat treatment for one hour at 550° C. and artificial ageing for four hours at 190° C.

The corrosion potentials were measured in the core and cladding following the procedure described in standard ASTM G69.

For 6056 sheet clad with 1050 (outside the invention) a difference in potential of 20 mV was found, for 6056 sheet clad with 7072 alloy (outside the invention, Zn content in the order of 1%) a difference in potential of 120 mV was found, and for 6056 sheet clad with 1050 alloy with the addition of 0.5% zinc (according to the invention) a difference in potential of 90 to 100 mV was found.

The 6056 sheet clad with 1050 therefore leads to cathodic protection that is too low, while the two other sheets give proper cathode protection; the value of 90 to 100 mV generally being considered as preferable.

EXAMPLE 6

A sheet in alloy 6056 (T6 temper) with a total thickness of 5 mm, clad on both surfaces, was prepared by hot rolling according to a process similar to the process described in example 3. The chemical composition of the core alloy was the following (% by weight): 0.88% Si, 0.75% Mg, 0.4% Cu, 0.61% Mn, 0.11% Fe, 0.15% Zn. One of the surfaces was clad with alloy 4045 containing about 10% of silicon; the thickness of said cladding was 130 μm. The other surface was clad with an AlZn type alloy containing 0.14% Si, 0.35% Zn, and 0.25% Fe. The thickness of said cladding was 90 μm. The mechanical properties are given in Table 11.

TABLE 11

| | $R_{0.2}$ (MPa) | $R_m$ (MPa) | A (%) | $R_{0.2}$ (MPa) | $R_m$ (MPa) | A (%) |
|---|---|---|---|---|---|---|
| Direction | TL | TL | TL | L | L | L |
| T6 | 342 | 375 | 13.7 | 360 | 374 | 13.3 |

The crack propagation rate da/dn was measured as in Example 1. The results are grouped together in Table 12.

TABLE 12

| ΔK [MPa√m] | 10 | 20 | 30 | 40 | 50 |
|---|---|---|---|---|---|
| da/dn (direction T–L) [mm/cycle] | 1.5 × 10$^{-4}$ | 1.5 × 10$^{-3}$ | 5 × 10$^{-3}$ | 2 × 10$^{-2}$ | 4 × 10$^{-2}$ |
| da/dn (direction L–T) [mm/cycle] | 1.6 × 10$^{-4}$ | 1.5 × 10$^{-3}$ | 4 × 10$^{-3}$ | 9 × 10$^{-3}$ | 2 × 10$^{-2}$ |

The corrosion potential was meassured as in Example 2 (average of 3 individual measurements):

Cladding (AlZn type alloy): −842 mV/SCE

Cladding (alloy 4045): −792 mV/SCE

Core (center): −733 mV/SCE

Core (200 μm from surface): −735 mV/SCE

It can be seen from these results that the difference in corrosion potential between the core and the sacrificial cladding (AlZn type alloy) is of the order of 110 mV.

EXAMPLE 7

Sheets of different compositions and thickness were prepared at T6 temper according to the processes described in the Examples above. All sheets (except the one prepared according to Example 1) were clad on one or both surfaces with an alloy containing between 0.3 and 0.7% Zn, up to 0.4% Fe, up to 0.25% Si and up to 0.10 of each of the elements Cu, Mn, Mg, Ti and V. The chemical composition of the core alloys is given in Table 13. Mechanical properties of the sheets were measured in T6 temper. In order to obtain a more significant comparison of the results, the mechanical properties of the core alloy were estimated from those of the clad sheet and the cladding thickness. This assumes that the cladding does not contribute to the mechanical strength of the clad sheet; this estimation does therefore not take into account the contribution of the cladding to mechanical strength shown in Example 4. Results are given in Table 14.

TABLE 13

| Ref | Origin | Si | Cu | Mg | Mn | Fe | Sum [Si] + [Mg] + 3 × [Cu] |
|-----|--------|------|------|------|------|------|----------|
| 1 | — | 0.83 | 0.57 | 0.73 | 0.56 | 0.07 | 3.27 |
| 2 | — | 0.83 | 0.57 | 0.73 | 0.56 | 0.07 | 3.27 |
| 3 | — | 0.83 | 0.66 | 0.72 | 0.60 | 0.07 | 3.53 |
| 4 | — | 0.83 | 0.57 | 0.73 | 0.56 | 0.07 | 3.27 |
| 5 | — | 0.87 | 0.66 | 0.74 | 0.60 | 0.07 | 3.59 |
| 6 | Ex. 3 | 1.01 | 0.67 | 0.71 | 0.55 | 0.14 | 3.73 |
| 7 | Ex. 2 | 0.85 | 0.67 | 0.71 | 0.59 | 0.12 | 3.57 |
| 8 | — | 0.85 | 0.67 | 0.71 | 0.59 | 0.12 | 3.57 |
| 9 | Ex. 1 | 0.91 | 0.64 | 0.76h | 0.59 | 0.13 | 3.59 |

TABLE 14

| Ref | Origin | Clad (%) | Thickness (mm) | $R_{0.2}$ (TL) (MPa) measured | $R_m$ (TL) (MPa) measured | $R_{0.2}$ (TL) (MPa) estimate | $R_m$ (TL) (MPa) estimate |
|-----|--------|----------|----------|---------|---------|---------|---------|
| 1 | — | 2.5 | 7 | 320 | 348 | 336 | 365 |
| 2 | — | 3.5 | 5 | 314 | 346 | 336 | 370 |
| 3 | — | 4 | 3.2 | 335 | 364 | 362 | 393 |
| 4 | — | 2.5 | 6 | 318 | 351 | 334 | 369 |
| 5 | — | 3 | 5 | 339 | 370 | 359 | 392 |
| 6 | Ex. 3 | 2 | 4.5 | 345 | 380 | 359 | 395 |
| 7 | Ex. 2 | 2 | 4.5 | 347 | 384 | 361 | 399 |
| 8 | — | 2 (one surface) | 4.5 | 355 | 390 | 362 | 398 |
| 9 | Ex. 1 | 0 (bare) | 6 | 359 | 379 | 359 | 379 |

It can be seen that the mechanical strenght of the core alloy increases as the sum (Si+Mg+3Cu) is higher than 3.50, wherein the individual concentrations are expressed in % by weight.

What is claimed is:

1. Clad sheet comprising a core sheet and a cladding layer on one or two core sheetsurfaces, the core sheet comprising an alloy consisting essentially of (% by weight): Si: 0.7–1.3, Mg: 0.6–1.2, Cu: 0.5–1.1, Mn: 0.15–1.0, Zn<0.5, Fe<0.5, Zr<0.2, Cr<0.25, other elements<0.05 each and <0.15 total, the remainder aluminum, and the cladding comprising an aluminum alloy having a thickness of between 1 and 15% of the clad sheet thickness, wherein the cladding comprises an AlZn alloy consisting essentially of (% by weight): Zn: 0.25–0.7, Fe<0.40, Si<0.40, Cu, Mn, Mg, V or Ti<0.10, other elements <0.05 each and 0.15 total.

2. Clad sheet according to claim 1, comprising cladding on one surface and on the other surface a second cladding alloy having a melting point lower than the core melting point.

3. Sheet according to claim 2, wherein the second cladding alloy is a 4xxx series aluminum alloy.

4. Clad sheet according to claim 1, wherein the core and cladding alloys have a difference in potential between 40 mV and 130 mV.

5. Sheet according to claim 1, having a thickness between 1 mm and 10 mm.

6. Sheet according to claim 1, having a grain size in direction L at mid-thickness within the core of less than 250 μm.

7. Sheet according to claim 1, wherein the sum (Si+Mg+3Cu) is higher than 3.50 (in % by weight).

8. Aircraft structural part comprising a clad sheet according to claim 1.

9. Structural part according to claim 8, wherein at least a portion of the clad sheet has been subjected to chemical polishing.

10. Process for manufacturing an aircraft structural part, comprising:

a) producing of a clad sheet by hot rolling, formed of a core sheet comprising an alloy consisting essentially of (% by weight): Si: 0.7–1.3, Mg: 0.7–1.1, Cu: 0.5–1.1, Mn: 0.15–1.0, Zn<0.5, Fe<0.30, Zr<0.20, Cr<0.25, other elements <0.05 each and <0.15 total, the remainder aluminum, and of a cladding comprising aluminum alloy on at least one surface, having a thickness per surface of between 1 and 15% of the clad sheet thickness, the cladding comprising an AlZn alloy consisting essentially of 0.3 to 0.7% zinc, up to 0.40% iron, up to 0.25% of silicon, up to 0.10% of each of the elements copper, manganese, magnesium, titanium, and vanadium, other elements <0.05 each and <0.15% total, the remainder aluminum, the other surface optionally being clad with a second cladding alloy;

b) optionally one or more cold rolling passes;

c) solution heat treating followed by quenching;

d) optionally one or more finishing operations;

e) optionally sheet forming;

f) assembling of the structural part by riveting several sheets and welding or riveting on stiffeners or frames, and g) optionally, artificial ageing of the structural part.

11. Process according to claim 10, additionally comprising homogenization of the rolling ingot for the core material before application of the cladding.

12. Process according to claim 11, wherein the homogenization is conducted in two steps.

13. Process according to claim 12, wherein the first step is conducted between 530° C. and 550° C., for a period of between 1 h and 8 h.

14. Process according to claim 12, wherein the second step is conducted between 555° C. and 575° C., for a period of between 18 h and 36 h.

15. Process according to claim 10, comprising an artificial ageing treatment of the assembled structural part conducted after quenching, before or after forming.

16. Process according to claim 15, wherein the artificial ageing is conducted at a temperature of between 170° C. and 200° C., for a period of between 1 h and 10 h.

17. Process according to claim 10, wherein the assembly is made by welding using laser beam or friction welding.

18. Process according to claim 10, wherein the second cladding alloy is a 4043, 4045 or 4047 alloy.

19. Airplane fuselage panel comprising clad sheets according to claim 1, which are assembled at least in part by welding.

20. Fuselage panel according to claim 19, wherein assembly is made by laser welding or friction welding.

21. Sheet according to claim 1, wherein the core sheet alloy contains 0.7–1.1 Mg.

22. Sheet according to claim 1, wherein the core sheet alloy contains 0.3–0.7 Mn.

23. Sheet according to claim 1, wherein the core sheet alloy contains <0.3 Fe.

24. Sheet according to claim 1, wherein the AlZn alloy contains 0.3–0.6 Zn.

25. Sheet according to claim 1, wherein the AlZn alloy contains <0.25 Si.

26. Sheet according to claim 1, wherein the cladding has a thickness of between 1.5 and 12% of the clad sheet thickness.

27. Sheet according to claim 3, wherein the cladding is a 4043, 4045 or 4047 alloy.

28. Sheet according to claim 4, wherein the difference in potential is between 50 and 110 mV.

29. Sheet according to claim 28, wherein the difference in potential is between 60 and 100 mV.

30. Sheet according to claim 6, wherein said grain size is less than 180 $\mu$m.

31. Process according to claim 10, wherein the core sheet alloy contains 0.3–0.7 Mn.

32. Process according to claim 10, wherein the cladding has a thickness of between 1.5 and 12% of the clad sheet thickness.

33. Process according to claim 10, wherein the second cladding alloy is a 4xxx series Al alloy.

* * * * *